United States Patent [19]

Galstaun et al.

[11] Patent Number: 4,568,364
[45] Date of Patent: Feb. 4, 1986

[54] PROCESS FOR DESULFURIZATION OF FUEL GAS

[75] Inventors: Lionel S. Galstaun, Houston; Robert F. Geosits, Spring, both of Tex.

[73] Assignee: Bechtel International Corporation, San Francisco, Calif.

[21] Appl. No.: 592,135

[22] Filed: Mar. 22, 1984

[51] Int. Cl.⁴ .............................................. B01D 47/00
[52] U.S. Cl. ......................................... 55/43; 55/55; 55/73
[58] Field of Search .................. 55/37, 38, 40, 42, 43, 55/46, 47, 48, 49, 53, 55, 56, 68, 73; 423/220, 210, 246, 228, 229

[56] References Cited

U.S. PATENT DOCUMENTS

| | | | |
|---|---|---|---|
| 3,245,752 | 4/1966 | Fryar et al. | 423/229 |
| 3,664,091 | 5/1972 | Hegwer | 55/73 |
| 3,824,766 | 7/1974 | Valentine et al. | 55/48 |
| 4,050,909 | 9/1977 | Ranke | 55/48 |
| 4,080,424 | 3/1978 | Miller et al. | 55/73 |
| 4,332,598 | 6/1982 | Antanos et al. | 55/73 |
| 4,430,316 | 2/1984 | Ranke et al. | 55/68 |

FOREIGN PATENT DOCUMENTS

| | | | |
|---|---|---|---|
| 2759123 | 7/1979 | Fed. Rep. of Germany | 55/73 |
| 2088240 | 6/1982 | United Kingdom | 55/55 |

Primary Examiner—Bernard Nozick
Attorney, Agent, or Firm—Townsend and Townsend

[57] ABSTRACT

Apparatus and a method for removal of acid gases from a first gas rich in carbon dioxide and for desulfurizing a second gas lean in carbon dioxide but containing sulfur compounds as impurities. The method includes contacting the first gas with a solvent capable of extracting carbon dioxide and sulfur compounds from the first gas. Then, the solvent containing carbon dioxide is separated from the solvent containing sulfur compounds. The second gas is then contacted with said solvent containing carbon dioxide under conditions sufficient to cause said solvent containing carbon dioxide to extract sulfur compounds from said second gas and to release carbon dioxide. The desulfurized second gas is thereafter separated from the solvent containing sulfur compounds from the second gas.

7 Claims, 3 Drawing Figures

PROCESS FOR DESULFURIZATION OF FUEL GAS

BACKGROUND OF THE INVENTION

The generation of electric power from fossil fuel is receiving careful scrutiny with respect to its impact on the environment. The impact can be measured in terms of heat and pollutant emissions to the biosphere. Emission of waste heat is an unavoidable result of thermodynamics, but the specific quantity of heat emitted per kilowatt of electricity generated can be minimized by improvement of the thermal efficiency of the power generating cycle. Pollutant emissions can be minimized preferably by treatment of the fuels prior to combustion, although post combustion treatment is also technically and, sometimes, economically feasible.

While coal, and particularly high-sulfur, high-ash coal, is considered to be a source of potentially high pollution, improved technology to convert coal to desulfurized, ash-free gas is one feasible means of avoiding deleterious emissions. The technology is continuing to be developed. The processes used for this process are designed to extract the sulfur from the raw gas and to recover the sulfur compounds as elemental sulfur. The ash is recovered as cinders or granulated slag, leaving only a clean gas that is benign in environmental impact for use as fuel.

Gasification of coal normally produces a raw gas which comprises largely carbon monoxide and hydrogen, admixed with lesser quantities of carbon dioxide and methane. In addition, gaseous sulfur compounds, notably $H_2S$ and COS, together with ammonia, elemental nitrogen, hydrogen cyanide and argon will be found at relatively low concentrations. Removal of the sulfur compounds, ammonia and cyanide can be accomplished economically, thus preventing the emission of sulfur compounds and reducing nitrogen oxides in the combusted gas.

Thermal efficiency of the power generation cycle can be significantly increased by combining the gas combustion turbine as a "topping" cycle with a "bottoming" steam turbine. The steam turbine may be either totally condensing, partially condensing, or non-condensing depending on the capability of the overall system to utilize low-pressure steam.

Whereas an installation where electric power is the sole product will have relatively minor uses for extraction steam, a multi-product plant can find many uses for steam at pressures of 200 psig or even lower. Typical uses for low pressure steam are found in chemical plants and petroleum refineries, where large quantities are used for process heat. Therefore, by joining the combined gas-steam turbine cycle with co-generation of moderate to low pressure steam for process heat, thermal efficiency can be maximized at the hot as well as the cold ends of the cycle with resultant minimum thermal impact on the environment.

Clearly, it would be desirable to locate a chemical plant or a petroleum refinery close or adjacent to a power plant so as to reduce the distance over which steam would need to be transported. But in addition to steam, chemical plants and petroleum refineries can utilize "syngas"—a gas which normally contains carbon monoxide and hydrogen, free from sulfur compounds. Such "syngas" may be utilized directly, or converted to hydrogen by shift conversion of the carbon monoxide and extraction of carbon dioxide.

The combined operation of power generation and chemical plant or petroleum refinery operation provides important opportunities such as:
1. Significantly improved thermal efficiency
2. Improved process economics because of larger scale in the gasification and gas purification plants
3. Improved overall economics from increased efficiency and savings in capital
4. Reduced environmental impact

SUMMARY OF THE INVENTION

The present invention is concerned with an improvement in the process and apparatus of producing desulfurized gas from the gasification of coal, where at least a significant fraction of the total gas is used for combined cycle power generation and another fraction for conversion to "syngas" or hydrogen. Under these specific conditions, there will be two or more gaseous streams requiring purification to remove carbon dioxide and/or sulfur compounds. Typically, the gas for fuel use will contain relatively low concentrations of carbon dioxide, whereas the gas to be diverted to synthesis will contain a relatively high concentration of carbon dioxide due to the conversion of a part or all of the carbon monoxide to hydrogen and carbon dioxide. This invention is concerned with an advantageous utilization of this difference.

Both carbon dioxide and hydrogen sulfide are acid gases and, therefore, are absorbed non-selectively in alkaline absorbents when the system is designed to approach chemical equilibrium. With physical solvents, such as methanol, N-methyl pyrolidone, the dimethyl ether of polyethylene glycol, or compounds of analogous structure, the situation is fundamentally different. In physical solvents, carbon dioxide often shows a significantly lower equilibrium solubility than hydrogen sulfide or carbonyl sulfide. Thus, hydrogen sulfide, while being absorbed, can displace carbon dioxide from a carbon-dioxide-rich physical solvent.

In acid gas absorption systems where a physical solvent is used to remove hydrogen sulfide and carbon dioxide which are present as impurities, the hydrogen sulfide is absorbed first. In installations where the absorption is accomplished in a counter current tower designed to absorb both hydrogen sulfide and carbon dioxide, with impure gas fed at the bottom and lean solution at the top, substantially complete removal of the hydrogen sulfide is typically accomplished in just the bottom part of the column. It follows, therefore, that the solution in contact with gas in the column above the $H_2S$ absorption zone will be free of $H_2S$.

Recalling now the fact that gas prepared for synthesis is richer in carbon dioxide than fuel gas, the principle involved in the present invention is as follows:
1. Provide a physical absorption column for extraction of acid gases from a raw syngas rich in $CO_2$ and containing $H_2S$.
2. Remove a part of the rich solution from the absorption column above the $H_2S$ absorption zone, and return the balance of the rich solution to the column to provide solvent for the removal of $H_2S$.
3. Deliver the $CO_2$-rich solvent from the absorption column to a second absorption column designed to extract $H_2S$ from the $CO_2$-lean fuel gas.

The advantages gained from the proposed mode of operation are as follows:

1. $CO_2$ is stripped from the rich solution by the $CO_2$-lean gas. This $CO_2$ is delivered into fuel gas at pressure, and enhances the potential for power from a gas turbine because of increased mass flow, or by saving power needed to compress excess combustion air needed to hold combusted gas temperature below a maximum limit determined by the materials used in the turbine.
2. Since part of the $CO_2$ is delivered into fuel gas, less is absorbed in the solvent, and therefore less is stripped from the solvent with the $H_2S$. The concentration of $H_2S$ in the acid gas delivered to the sulfur (Claus) plant is increased, thus raising the efficiency of the Claus plant. Simultaneously, regeneration energy demand is reduced in the acid gas extraction plant.
3. Since some of the solvent is used twice, total circulation of solvent is reduced, thus having pumping power.

PRIOR ART

The following U.S. patents relate to desulfurization of fuel gas:
1. U.S. Pat. No. 3,824,766 issued July 23, 1944 to W. Luley and J. Valentine, assigned to Allied Corp.
2. U.S. Pat. No. 4,332,598 issued June 1, 1982 to R. J. Allam, I. A. Antonas and W. P. Hegarty, assigned to Air Products and Chemicals.

U.S. Pat. No. 3,824,766 describes an "adiabatic" process for purification of hydrocarbon gases containing $CO_2$ and sulfur compounds as impurities. In the process, a $CO_2$-laden physical solvent is used to extract sulfur compounds from the impure gas stream. After removal of the sulfur compounds, the partly purified gas stream is passed to an expansion turbine where work is produced and the gas, which still contains $CO_2$, is chilled, but is now at a pressure that is lower than the impure gas. The chilled gas is contacted with warm, lean solvent. The solvent is thereby cooled and partially saturated with $CO_2$, and the $CO_2$ laden solvent is then pumped to the main absorber to extract sulfur compounds from the impure gas stream.

The process operates without any external coolant, or source of power. All the cooling and pumping energy requirements are provided by the expansion of the gas in the expander. This feature, which is clearly valuable and desirable for utilization in arid areas, also imposes a limitation on the concentration of $CO_2$ and sulfur compounds present in the gas, and may make it inapplicable to gases rich in $CO_2$ and $H_2S$ such as would be obtained by shift conversion of gas from partial oxidation of fuel oil or coal.

Another limitation would result in the expansion ratio that is permissible in the expander. For example, if the treated gas is required at or about the pressure of the feed gas, the process would no longer be "adiabatic".

U.S. Pat. No. 4,332,598 also uses a $CO_2$-laden physical solvent to extract the bulk of the sulfur compounds from an impure gas. The partially purified gas is then contacted with fully regenerated solvent to extract the $CO_2$ and the remaining sulfur compounds, mostly COS. The second absorption produces the $CO_2$-laden solvent, part of which is used for the extraction of the bulk of the sulfur. The remainder is sent to a $CO_2$ stripper where a $CO_2$-rich stream and regenerated solvent are separately recovered. The $CO_2$-rich stream is then fractionated under cryogenic conditions to produce pure $CO_2$ suitable for use in urea synthesis. The rich solvent from the first absorber, containing the bulk of the sulfur compounds is regenerated in a stripper to recover a gaseous concentrate of the sulfur compounds and a lean solution suitable for use in the $CO_2$ absorber. The sulfur compound concentrate may be converted to elemental sulfur in a Claus plant.

The primary object of the present invention is to provide process and apparatus for producing desulfurized gas from the gasification of coal in which a significant fraction of the total gas can be used for combined cycle power generation and another fraction for conversion to "syngas" or hydrogen.

Other objects of this invention will become apparent as the following specification progresses reference being had to the accompanying drawings for illustrations of several embodiments of the invention.

IN THE DRAWINGS

DETAILED DESCRIPTION OF THE INVENTION

Figure 1:
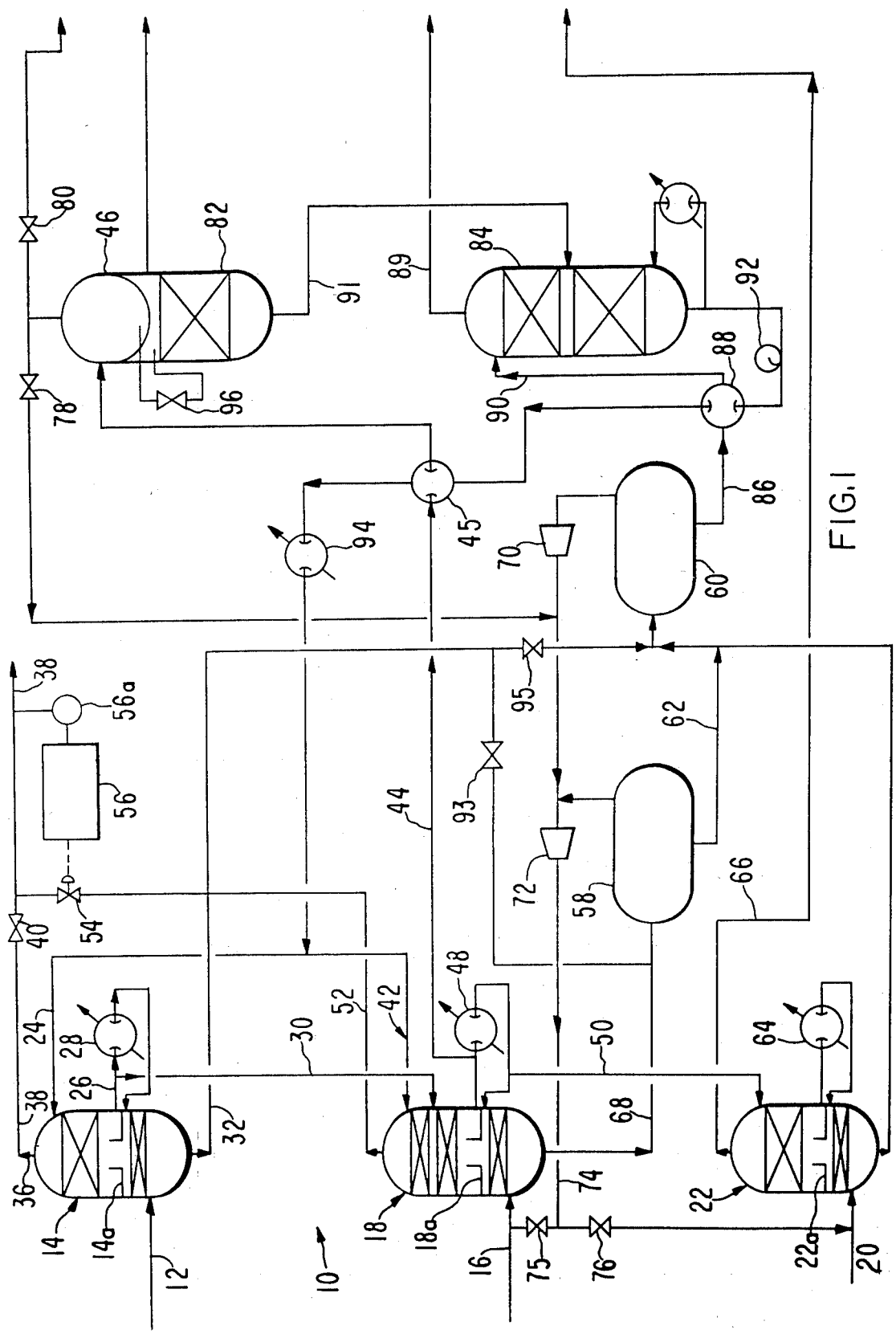
FIG. 1 is a schematic view of the apparatus forming one embodiment of the invention.

This invention is an improvement on acid gas solvent extraction processes. It is not dependent on any specific solvent, but it does require that the solvent have a preferential selectivity for hydrogen sulfide over carbon dioxide. Thus, methanol, N-methyl pyrolidone, and the dimethyl ether of polyethylene glycol are all suitable since all show a significantly higher equilibrium solubility for hydrogen sulfide than for carbon dioxide. Tertiary ethanolamine solutions in water have a significantly higher rate of absorption for $H_2S$ than for $CO_2$, and this kinetic behavior, can also be used to obtain selective absorption of $H_2S$.

The process of the present invention is advantageously applied to cases where the project requires treatment of raw gases where at least one gas requires only desulfurization, and the other requires extraction of both sulfur compounds and carbon dioxide. Typical of such projects are those where coal or fuel oil gasification is used to generate a fuel gas to power a gas turbine with or without combination with a steam turbine, and a gas which is intended for chemical synthesis. Under such conditions, it is common practice to divide the raw gas intended for synthesis into two portions, one of which is passed to a shift reactor to convert a major portion, typically 75 percent or more, of the carbon monoxide present to hydrogen by the shift reaction:

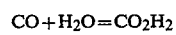

$$CO + H_2O = CO_2 H_2$$

After treatment to remove impurities (including $CO_2$), the shifted gas which is rich in hydrogen, and the unshifted gas which is rich in carbon monoxide may be blended to produce the ratio of hydrogen to carbon monoxide required by the synthesis. Methanol synthesis, for example, calls for a hydrogen to carbon monoxide ratio of 2. Methane requires a ratio of 3. Ammonia requires only hydrogen, which may be blended with purified nitrogen from an outside source to make suitable synthesis gas having a hydrogen to nitrogen ratio of 3.

Where fuel gas is desired as a product, the raw gas needs only to be desulfurized. Carbon dioxide may advantageously be left in the purified gas, and, where the fuel gas is to be used in a gas turbine in either a "stand alone" power cycle or in combination with a steam turbine, enrichment of the turbine fuel with $CO_2$ while extracting sulfur compounds enhances power output and reduces $NO_x$ emissions.

The following approximate compositions are typical of the raw gases derived from coal by high temperature gasification. The two columns illustrate the effect of shift conversion.

TABLE 1

|  | Unshifted Gas | Shifted Gas |
|---|---|---|
| CO, Mol % | 47.0 | 5.4 |
| $H_2$ | 35.5 | 55.7 |
| $CO_2$ | 15.0 | 39.1 |
| $CH_4$ | 0.2 | 0.15 |
| $H_2O$ | 0.2 | 0.15 |
| $H_2S$ | 1.2 | 0.9 |
| COS | 0.1 | (0.02) |
| $N_2$ + Ar | 0.8 | 0.6 |
|  | 100.0 | 100.00 |
| Pressure PSIA | 500–800 | 500–800 |
| Temperature, °F. | 100 | 100 |

Purification of the gases depends on the ultimate use. For example, if the gas is intended for fuel use, an unshifted gas would be used, and removal of sulfur compounds would have to exceed 90 percent or more of the sulfur present. The exact level of desulfurization needed would be dependent on local environmental regulations. For fuel gas, as noted earlier, carbon dioxide does not need to be removed.

For methanol use, shifted and unshifted gases may be blended to obtain a ratio of $H_2$ to CO of 2 and the blend purified. Typically, for "low pressure" methanol synthesis, sulfur levels need to be reduced to less than 1 ppm by volume; and $CO_2$ needs to be reduced to about 5 mol percent in the feed gas to the methanol synthesis.

For hydrogen use, the gas needs to be shifted to the maximum practical extent, and two or more stages of reaction with cooling between stages may be required. Typically, desulfurization will be carried to 1 ppm or less, and $CO_2$ to less than 1 mol percent in preparation for final methanation to convert the remaining carbon oxides to methane. For ammonia, the purification requirements are similar, but the final step may be a liquid nitrogen wash in lieu of methanation. The desired molal ratio of hydrogen to nitrogen of 3 can be adjusted in this step.

If natural gas is the desired product, the $H_2$ to CO ratio needed is 3 as reflected in the stoichiometry of the reaction

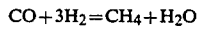

$$CO + 3H_2 = CH_4 + H_2O$$

However, for methane synthesis, an alternate reaction is also provided

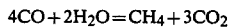

$$4CO + 2H_2O = CH_4 + 3CO_2$$

By properly combining the above reactions in the presence of a suitable catalyst, it is possible to synthesize methane without a separate shift step.

A system illustrating the improved process as applied to treatment of shifted and unshifted gases for preparation of desulfurized, $CO_2$-enriched fuel and chemical synthesis gas free of sulfur and with a low $CO_2$ content is illustrated in FIG. 1 and denoted by the numeral 10.

Referring to FIG. 1, system 10 includes a conduit 12 which delivers cooled gas largely free of particulates having a composition represented approximately by the "Unshifted Gas" column in Table 1, to a first absorber tower, 14. A second conduit 16 delivers gas represented by the "Shifted Gas" analysis in Table 1 to a second absorber tower 18; and a third conduit 20 delivers "Unshifted Gas" to a third absorber tower 22. Absorber towers 14 and 18 are designed to purify gas destined for use in synthesis, whereas tower 22 will be designed to desulfurize fuel gas, and to enrich it with $CO_2$.

Tower 14 is provided, through a conduit 24, with cooled, and in some instances, refrigerated lean absorption solution. As noted previously, the absorption solution may be methanol, in which case it may be chilled to $-20°$ F. or colder; or it may be the dimethyl ether of polyethylene glycol, typically cooled to about 40° F.; or it may be N-methyl pyrolidone, cooled to about 100° F. Finally, it may be an aqueous solution of an alkaline absorbent which shows a significantly higher absorption rate for $H_2S$, such as a tertiary ethanolamine, for example triethanol amine or methyl diethanol amine. The solvent rates are related to the volume and composition of the gas; but these relationships are proprietary information that is available from the process licensors under appropriate legal safeguards. Given the applicable correlations, the proper solvent rates can be calculated by conventional engineering methods by one skilled in the art. In any event, the present invention is applicable to all of the above solvents, since all provide selective absorption of sulfur compounds.

Solvent delivered to absorber tower 14 through conduit 24 descends in the tower, while making contact with unshifted gas rising in countercurrent flow to the solvent. Carbon dioxide is absorbed by the solvent in the upper portion of the tower. $CO_2$-rich solvent is collected at the "hat tray" 14a and withdrawn from tower 14 as semi-rich solvent substantially free of sulfur compounds through a conduit 26. A part of the semi-rich solvent is cooled in a cooler 28 and returned to tower 14 below the "hat tray" thereof where it again contacts rising gas in counter current flow. In this lower portion of the tower, substantially all of the $H_2S$ and other sulfur compounds are extracted from the gas together with a relatively minor part of the carbon dioxide.

Cooling of the semi-rich solvent is preferable but not necessarily essential; said cooling promotes the solubility of the $H_2S$, and removes heat generated by the absorption of $CO_2$ in the upper portion of the tower.

A portion of the semi-rich solution bypasses the cooler 28 and is delivered to the absorber tower 18 through a conduit 30. This arrangement, which is not essential to the process of the present invention, permits the use of semi-rich solution from absorber tower 14 in absorber tower 18 where it treats gas that is much richer in $CO_2$ than the gas in absorber tower 14.

Rich solution containing substantially all of the sulfur compounds delivered through conduit 12 is removed from absorber tower 14 through a conduit 32 and delivered to a flash tank 60. Treated gas, substantially free of sulfur, and largely free of $CO_2$ exits absorber tower 14 through a conduit 36 and is delivered to a synthesis plant through a conduit 38 at a rate that is regulated by the on-line analyzer 56a and "composition control" computer 56 and by a flow control valve 40 in series with conduits 36 and 38. The flow control rate is set to provide the proper amount of CO-rich purified gas to meet the $H_2$ to CO ratio required by the synthesis unit.

With reference to absorber tower 18, shifted gas corresponding generally to the composition given under the "Shifted Gas" column of Table 1, is delivered to the absorber tower 18 by conduit 16. This gas is rich in hydrogen and carbon dioxide and lean in carbon monoxide. By contrast, the gas treated in absorber tower 14 is relatively lean in carbon dioxide and rich in carbon monoxide. For this reason, the semi-rich solution withdrawn from the $CO_2$ absorbing section of absorber tower 14 has significant remaining capacity for additional $CO_2$ at the high $CO_2$ concentration prevailing in the shifted gas absorber.

To complete the clean-up of $CO_2$, fully regenerated and cooled lean solvent is supplied to the top of the absorber tower 18 through a conduit 42. It may be advantageous in treatment of gas rich in $CO_2$ to provide an additional side cooler (not shown) to remove the heat of absorption of $CO_2$ and enhance its more complete removal. This detail can be evaluated on the basis of specific needs by anyone skilled in the art.

As in absorber tower 14, a "hat tray" 18a is provided to trap out the $CO_2$-rich solution. Part of this stream is sent through a conduit 44 to a $CO_2$ stripper 46. The remainder is cooled in a heat exchanger 48, and of this remainder, a part is returned to the column below the "hat tray" 18a to extract sulfur compounds from the shifted gas. The balance is delivered through a conduit 50 absorber tower 22.

Purified shifted gas, which is mostly hydrogen, is conveyed from absorber tower 18 through a conduit 52 to conduit 36 by way of a regulating valve 54 which controls the quantity of hydrogen required to meet the hydrogen to CO ratio specification of the synthesis gas. The composition of the synthesis gas is determined by the on-line analyzer 56a, and the flow through valve 54 is controlled by a computer system. Purified synthesis gas is delivered to the synthesis plant by way of conduit 38.

Solution rich in $CO_2$ and $H_2S$ is delivered from absorber tower 18 to a flash tank 58 where the pressure is dropped to about one-half of the absolute level prevailing in absorber tower 18. The flashed liquid proceeds then to a flash tank 60 by way of a conduit 62 where the pressure is about one quarter to one third of that in absorber tower 18. In case the pressure in absorber tower 18 is very high, for example, 800 to 1000 psi, a third flash tank may be used.

The fuel gas absorber tower 22 operates solely to remove sulfur compounds from the unshifted gas. Noting that the absorption solvent supplied to absorber tower 22 through conduit 50 is saturated with $CO_2$ at a partial pressure several times as high as the partial pressure of $CO_2$ in the unshifted gas fed to absorber tower 22, it is clear that a significant portion of the dissolved $CO_2$ will be stripped from the solvent by the unshifted gas. At the same time, $H_2S$ and other sulfur compounds in the gas will be preferentially absorbed. Absorber tower 22 is also provided with a "hat tray" 22a for potential use with a side stream heater or coller 64. In most instances, side cooling will probably be unnecessary because the adiabatic cooling from desorption of the dissolved $CO_2$ should be sufficient to hold temperature at a desired level.

Treated fuel gas, substantially reduced in sulfur content, is delivered from absorber tower 22 to the fuel gas system by way of a conduit 66.

Rich solvent from absorber tower 22 combines with rich solvent from absorber tower 14 and flashed solvent from flash tower 58 en route to flash tank 60. This completes the description of the absorption portion of the process cycle.

An important feature of the invention encompasses the use of $CO_2$-rich solvent from the $CO_2$ absorption section of an absorber treating $CO_2$-rich gas, and which $CO_2$-rich solvent is substantially free of $H_2S$, to treat a fuel gas stream for the removal of sulfur compounds. Where the fuel gas is to be used in a combustion turbine, this mode of operation has a number of economic and environmental advantages, among which are:

1. A reduced total circulation rate of solvent because at least a part of the solvent is effectively used twice;
2. Increased potential power output from the gas turbine because the $CO_2$ in the gas contributes to mass flow and requires less compression of excess air for control of combusted gas temperature;
3. Reduced potential release of $NO_x$ to the environment because less air is needed for the gas turbine, and thus leading to lower nitrogen content of the combustion gas; and
4. Improved potential recovery of sulfur from the acid gas feed to a Claus plant because of incrementally higher $H_2S$ content of the feed gas to the Claus plant, resulting from diversion of part of the $CO_2$ to the turbine fuel.

The remainder of the process flow is largely conventional for the physical solvent type of acid gas removal plant, but will be described for the sake of completeness.

$CO_2$-rich solvent containing $H_2S$ and other sulfur compounds from shifted gas is conveyed by conduit 68 from the bottom of absorber tower 18 to flash tank 58. Typically, the pressure in flash tank 58 may be about one-half of the pressure, on an absolute basis, of the pressure in the absorber tower 18. This pressure can be optimized, in conjunction with the pressure in the second flash tank 60, to minimize the total power required to compress the flash gases from the two flash tanks for recycling to the absorber. The optimum pressure may be somewhat higher or lower than half of the pressure of the absorber. Alternatively, a third stage of flashing may be justifiable.

The purpose of the flash operation is to release the non-acid gases, notably CO and hydrogen, which are dissolved in the rich solvent, and thus keep them out of the acid gas concentrates. Typically, also, the flash gases will be relatively higher in $CO_2$ to $H_2S$ ratio than the feed gas, and therefore, the flash helps to raise the concentration of $H_2S$ in the acid gas stream sent to the sulfur recovery plant (Claus plant) by forcing part of the $CO_2$ to the $CO_2$ absorption system.

Rich solvent streams from absorber towers 14 and 18 are sent directly to flash tank 60, since these streams are already relatively rich in the $H_2S$, and need only to release the dissolved CO and $H_2$. The flashed gas from flash tank 60 is compressed in the recycle compressor 70 to about the pressure of flash tank 58, and the compressed gas combined with flash gas from flash tank 58, compressed further by compressor 72 and returned to the absorber towers 18 and 22 through conduit 74. The recycle gas may be returned either to absorber towers 18 or 22, or to both in any convenient proportion, although the objective of enriching the fuel gas with $CO_2$ will be enhanced by delivering the recycle gas to tower 22 and is therefore the preferred mode of operation.

There may be cases where absorber tower 22 is operated at a lower pressure than absorber tower 18, for example when the fuel gas does not need to be at as high a pressure as synthesis gas. In such a case, the flash gas could even more advantageously be diverted to Absorber 22 and compressor 72 eliminated. At the same time, rich solvent from absorber 14 would flow first to flash tank 58 by appropriate setting of the valves 93, 95, 75 and 76, and then join flashing rich solvent from absorber tower 22 in flash tank 60. Rich solvent flow from absorber tower 18 would continue to flow to flash tank 58.

$CO_2$-rich solvent, free of sulfur compounds, may be available in excess from the "hat-tray 18a" of absorber tower 18. Such a situation may arise in a plant where the volume of fuel gas treated in absorber tower 22 is relatively small, thus requiring only part of the excess available $CO_2$-rich solvent from absorber tower 18. Alternatively a similar situation may arise where the products are hydrogen and fuel gas. In such cases, it is often advantageous to withdraw a portion of the $CO_2$-rich solvent through conduit 44 and send this, after a slight warming in exchanger 45, to flash vessel 46, there to release a nearly pure $CO_2$ gas. This gas may be vented from the system, thus releasing some of the regenerating load on the plant. The $CO_2$ will contain a minor amount of hydrogen as the principal impurity. Carbon monoxide will be present only at trace levels because of its low concentration in the shifted gas.

Flashing of the $CO_2$ from the $CO_2$-rich solvent will result in substantial cooling of the solvent. The cooling reduces the volatility of the solvent, and thus helps to conserve solvent losses.

Flashed gas may, at times, contains $H_2S$ due to mal-operation of absorber tower 18. In such cases, by appropriate setting of valves 78 and 80 the flashed gas may be recycled to the absorbers via compressor 72 so as to retain $H_2S$ while the mal-operation persists, thus preventing its release to the environment.

Flashed solvent from flash vessel 46 flows through valve 96 to the top of a $CO_2$-stripper 82. Here, $CO_2$ is largely stripped from the solvent by a counter current stream of stripping gas, usually nitrogen (stream not illustrated).

Stripped solvent from $CO_2$-stripper 82 is fed through conduit 91 to an intermediate zone in $H_2S$ stripper 84 in order remove residual $CO_2$ in the solvent. This is required to reduce the $CO_2$ level of treated synthesis gas to a fraction of 1 mol percent. If such a high degree of $CO_2$ removal is not required, a major part of the circulating solvent could be returned to the absorbers from the $CO_2$-stripper 82. A saving in regeneration heat will result.

Finally, flashed solvent from flash tank 60, containing substantially all of the sulfur compounds in the feed gas, is conveyed via conduit 86 to feed-bottoms exchanger 88 where it is heated by indirect heat exchange against hot, reboiled solvent from the bottom of $H_2S$ stripper 84. The flashed and heated rich solvent then flows to the top of $H_2S$ stripper 84 by conduit 90 where it is fully regenerated by stripping substantially all of the $H_2S$ and $CO_2$ held in solution. The $H_2S$ and $CO_2$, comprising roughly 30 mol percent $H_2S$ and the balance mostly $CO_2$, is sent via conduit to a sulfur plant of the Claus or equivalent type (not shown) where the sulfur is recovered as the elemental material.

The hot, regenerated solvent from the bottom of $H_2S$ stripper 84 is pumped by pump 92 through heat exchangers 88, 45 and a chiller 94 where it is cooled to a temperature appropriate for the specific solvent. This temperature may be as low as $-20°$ to $-40°$ F. for methanol or as high as 100° F. for N-methyl pyrolidone. The lean solvent then is delivered to the absorber towers 14 and 18, thus completing the cycle.

Several variants of this system can be used. For example, it may frequently turn out that fuel gas is needed at a significantly lower pressure than synthesis gas. In such a case, consideration may be given to expanding the fuel gas feed to absorber tower 22 through an expander turbine to cool the gas while reducing pressure. Taking such a step would reduce the overall cooling requirement and thus save operating cost.

System 10 is intended only to illustrate the central features of the invention. Clearly, if methanol were used as a solvent, requiring extraction temperatures in the sub-zero Fahrenheit range, substantial heat exchange between feed and product gases would be economically justified. For simplicity, all such heat exchange has been omitted from FIG. 1, but could be selected and designed by an engineer normally skilled in the art.

The process illustrated in FIG. 1 is designed to produce an $H_2S$ concentrate in the overhead of the $H_2S$ stripper 84 (in FIG. 1). The concentration of the $H_2S$ in this stream may be 30 mole percent or higher, and the stream may then be processed by a fairly conventional Claus plant for recovery of the sulfur as the elemental material.

In cases where low sulfur coal is being gasified, the $H_2S$ will normally be a low percentage of the total acid gas. Under these circumstances, the $H_2S$ content of the overhead gas leaving stripper tower 84 via conduit 89 may be significantly below 30 percent; this factor may reduce the efficiency of conversion of $H_2S$ to elemental sulfur in the downstream Claus plant (not shown). Under these conditions, it may be advantageous to insert a separate stripping tower prior to exchanger 88. This tower (not shown) would be designed to strip the fluid leaving flash tank 60 via conduit 86, using nitrogen or other inert gas. The overhead gas from this added tower would then be conveyed to the bottom of $CO_2$ stripper 82, and the stripped liquid to exchanger 88. Partially stripped solvent leaving the bottom of $CO_2$ stripper 82 will be conveyed via conduit 91 to the mid-section of $H_2S$ stripper 84 as before.

The 30 percent minimum in the $H_2S$ concentration of this gas normally corresponds to the minimal requirements for combustibility. In specially designed Claus plants, lower concentrations can be tolerated. There are a number of these special designs, ranging from a simple addition of supplemental fuel gas, to recycle of product sulfur or pre-concentration of the $H_2S$ by feeding the gas to the absorber of a SCOT or similar Claus tail gas treatment system. The specific method of modifying the conventional Claus plant is not a concern of this invention.

However, if any of the modified Claus systems is used, making it possible to relax the requirement of a combustible $H_2S$ concentrate, the process of the invention can be significantly simplified. This simplification is illustrated in FIG. 2.

Figure 2:
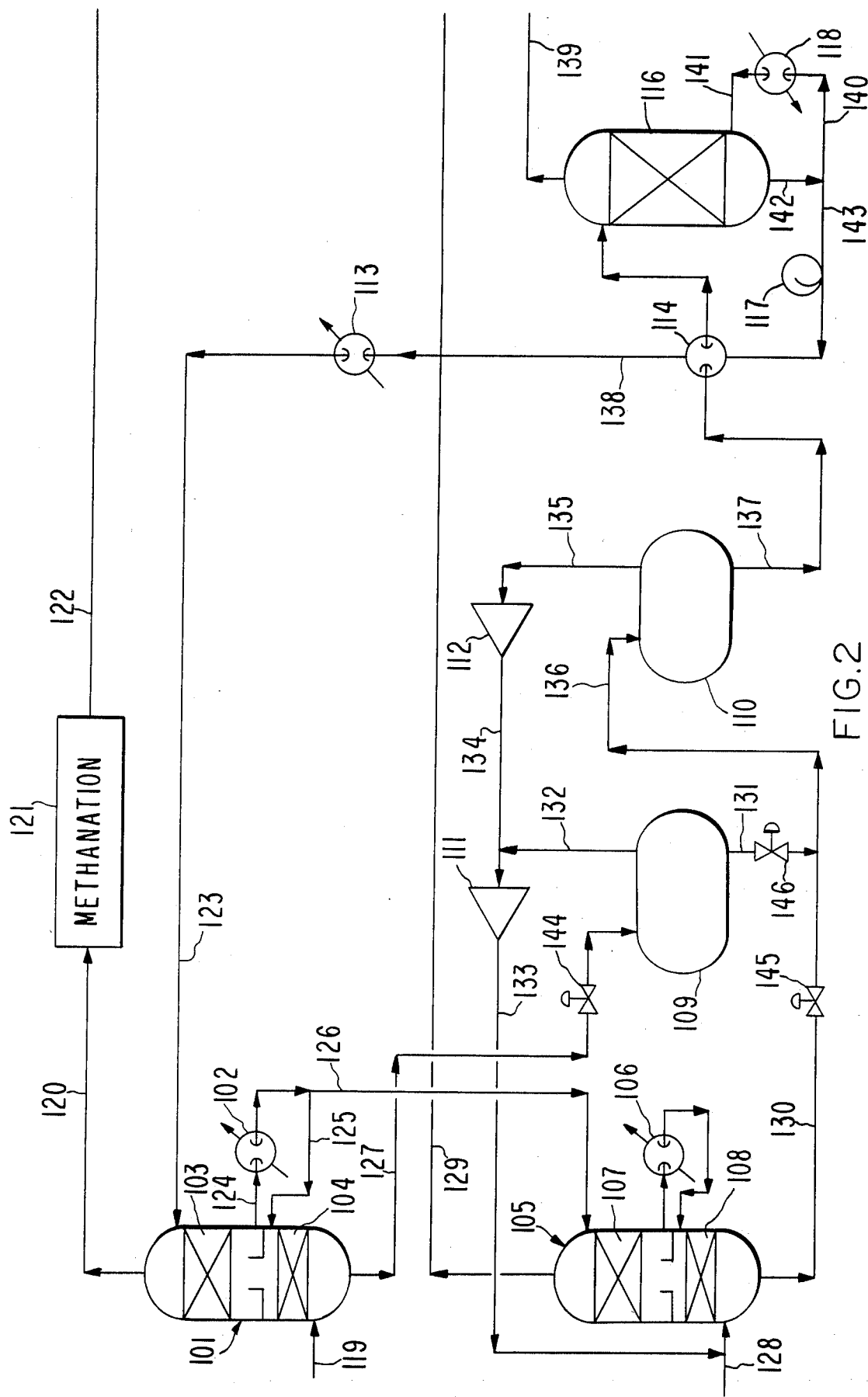
FIG. 2 is a view similar to FIG. 1 but showing another embodiment of the invention.

FIG. 2 is a simplified flow sheet for a process plant producing hydrogen and fuel gas. A typical application would be where the hydrogen is utilized by a petroleum refinery or ammonia-fertilizer plant which may require fuel gas for use either directly or in a co-generation system which provides steam and power for the whole facility. The power may advantageously be generated in a combined cycle utilizing gas and steam turbine drivers for the generators. Referring to FIG. 2, a source of scrubbed gas, substantially free of particulates, is reacted with steam in a shift converter (not shown), wherein the carbon monoxide is largely converted to $CO_2$ and hydrogen according to the reaction $$CO + H_2O = CO_2 + H_2$$

This gas is then cooled, whereby most of the unreacted steam is condensed and separated. The gas, at this point, typically will have a composition approximately as given in Table 1 under "Shifted Gas". In some cases two stages of shift conversion and COS hydrolysis may be used. In such cases, the content of carbon monoxide will be reduced to 1-2 mol percent, and there will be consequent increases in carbon dioxide and hydrogen. This scrubbed gas enters along line 119 and is delivered to the bottom of the absorber 101. Here, it is contacted with a physical absorbent or a selective type of chemical absorbent. Typically, $H_2S$ will be preferentially and rapidly absorbed such that the gas leaving the absorption section 104 of absorber 101 will be substantially free of $H_2S$.

The $H_2S$-free gas is then passed through the "hat tray" and enters the main absorption section 103 where most of the carbon dioxide is absorbed by the absorbent. Purified gas, substantially free of $CO_2$ and $H_2S$ is then conveyed by line 120 to a methanation unit wherein the residual carbon monoxide and carbon dioxide are converted to methane by the well-known reactions:

$$CO + 3H_2 = CH_4 + H_2O$$

$$CO_2 + 4H_2 = CH_4 + 2H_2O$$

Finally, purified hydrogen, suitable for hydrotreatment of petroleum fractions, or (after blending with oxygen-free nitrogen) for ammonia synthesis, leaves the process via line 122.

Returning to the absorber 101, cooled liquid absorbent enters the top of the column above zone 103 through line 123. Descending liquid contacts the ascending gas countercurrently, absorbing mostly carbon dioxide in its path downward. The absorption process generates heat so that the absorbent is warmed as it descends.

Figure 3:
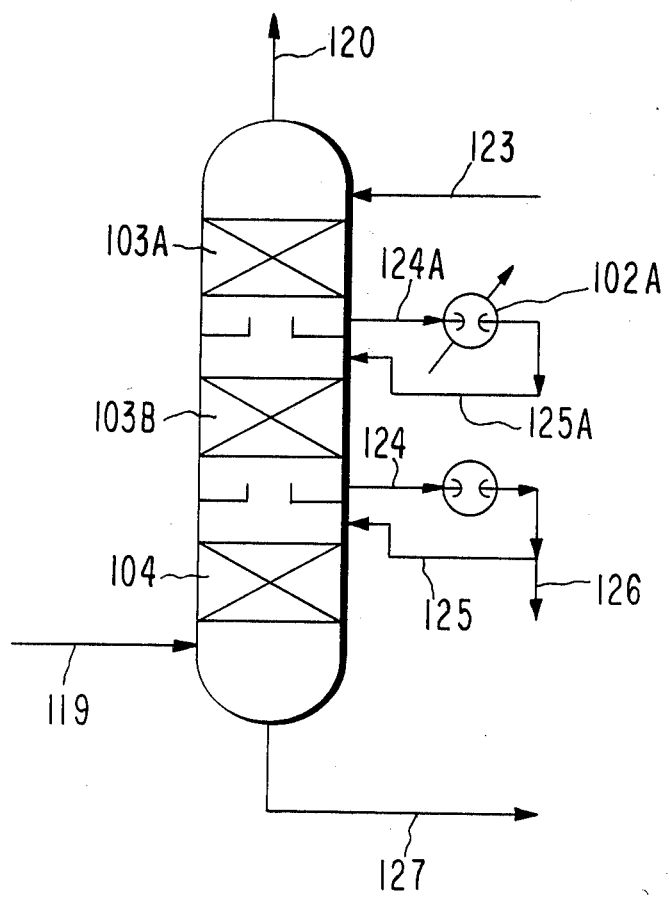
FIG. 3 is a schematic view of an improved absorption zone in the apparatus of FIG. 2.

Rich absorbent, loaded with carbon dioxide is trapped in a "hat" tray and exits the absorber via line 124, entering chiller 102 where it is cooled by indirect thermal contact with coolant provided from an outside source. Cooled rich absorbent exits chiller 102 and is divided, one part being returned to absorber 101 via line 125 and another part being diverted to absorber 105 via line 126. Internal heat balances may require an additional chiller to remove heat of absorption of $CO_2$. In such cases, the extra side chiller may advantageously be located in the middle of absorption zone 103, as illustrated in FIG. 3. Alternatively, no chiller may be needed, in which case chiller 102 may be deleted.

Returning to the absorber 101, the rich absorbent, with capacity to absorb $H_2S$, contacts gas in zone 104. Rich absorbent, containing $H_2S$ and $CO_2$ exits absorber 101 via line 127. It passes through a pressure-reducing valve 144 and flashes in flash tank 109, releasing a gas rich in $CO_2$ but containing $H_2S$ and traces of hydrogen. The released gas leaves tank 109 through line 132 which conveys it to the inlet of second stage compressor 111. The gas is compressed for further treatment which will be described later. Flashed liquid leaves tank 109 through line 131 and pressure reducing valve 146 and is delivered to second flash tank 110 through line 136.

The liquid entering tank 110 flashes again, releasing more $CO_2$ and $H_2S$. The released gas leaves tank 110 through line 135 which conveys it to the inlet of first stage compressor 112. The gas is compressed and delivered to the inlet of compressor 111 via line 134 where it mixes with the gas released from tank 109, and is compressed to elevated pressure and delivered to absorber 105 via line 133. The compressed gases discharged from compressors 112 and 111 may advantageously be cooled in coolers (not shown) as is common practice.

We now turn attention to absorber 105. Scrubbed and cooled gas, substantially free of particulates and corresponding roughly in composition to that shown in Table 1 under "Unshifted Gas", is delivered to the base of absorber 105. This gas differs most significantly from the feed to absorber 101 in the relatively high content of carbon monoxide and low content of carbon dioxide.

This gas is washed in counter current operation with absorbent just as the shifted gas in absorber 101. However, the absorbent in absorber 105 has been presaturated with $CO_2$ at a much higher partial pressure of $CO_2$ than exists at any point of absorber 105. The result is that $CO_2$ is stripped from the $CO_2$-rich absorbent. It may be noted that the stripping of $CO_2$ will result in substantial cooling of the absorbent. Under some circumstances, it may be feasible to utilize such cooling to allow bypassing of the absorbent flowing to absorber 105 through line 126 around the chiller 102, or chiller 102 may be omitted as noted above.

While the absorbent fed to absorber 105 is rich in $CO_2$, it is essentially free of $H_2S$ since it was removed from absorber 101 before it reaches the $H_2S$-absorption zone. As described above with reference to FIG. 1, the absorbent will therefore release $CO_2$ into the gas stream while it absorbs $H_2S$ and COS.

The primary function of absorber 105 is to remove $H_2S$ and COS from the unshifted gas to make it environmentally acceptable as fuel. Simultaneously, $CO_2$ is released from the absorbent into the treated gas. The release of $CO_2$ will normally provide sufficient chilling of the absorbent to make exchanger 106 unnecessary. If substantial quantities of $CO_2$ are being stripped, it may be advantageous to offset the cooling effect by converting exchanger 106 to a heater. However, in commercial operation, it may be necessary to continue manufacture of fuel gas when the hydrogen facility is shut down, in which case the exchanger 106 would be required to cool the gas if the feed gas contains a substantial amount of $CO_2$. If, however, the $CO_2$ content of the feed gas to absorber 105 is low enough, typically less than 10 mol percent, chiller 106 could be omitted altogether.

Treated gas, substantially free of $H_2S$ but containing more $CO_2$ than the feed, leaves absorber 105 through line 129 and is delivered to the fuel system. Advantageously, this gas may be used in a gas turbine-steam turbine combined cycle where the gas turbine net output may be significantly increased while reducing the formation of nitrogen oxides.

Rich absorbent, containing substantially all of the sulfur in the feed, but deficient in $CO_2$ compared to the rich absorbent in line 127, exits absorber 105 through line 130. Its pressure is released during passage through regulating valve 145. It then mixes with the liquid effluent from flash tank 109, and is conveyed to second flash tank 110. The combined flash gas leaves tank 110 through line 135 and is delivered to the inlet of first stage compressor 112, and on to the second stage compressor 111, as described earlier.

Flashed liquid from tank 110 comprises doubly flashed absorbent from absorber 101 and singly flashed absorbent from absorber 105. The liquid exits from flash tank 110 through line 137, is heated by indirect heat exchange in heat exchanger 114, and is then delivered to $H_2S$-stripper 115. Here, $H_2S$ and $CO_2$ are stripped substantially completely in the stripping zone 116 by countercurrent contact with vaporized absorbent from steam-heated reboiler 118. Hot, lean absorbent, essentially free of $CO_3$ and $H_2S$, exits the $H_2S$ stripper 115 through line 142 and is conveyed through line 143 to pump 117. The lean absorbent is partially cooled in exchanger 114 by indirect heat exchange against flashed rich absorbent, and is further cooled in exchanger 113. From here, the lean absorbent enters line 123 which conveys it to absorber 101, thus completing the absorbent cycle.

Stripped $H_2S$ and $CO_2$ exit the $H_2S$ stripper through line 139 which conveys the gas mixture to the sulfur recovery section.

Temperatures and pressures for the absorbers, flash tanks and the $H_2S$ stripper are substantially the same as for conventionally designed plants using methanol, dimethyl ether of polyethylene glycol or N-methyl pyrolidone as the physical absorbents. Absorbent circulation rates will be reduced in comparison to conventionally designed plants using completely stripped absorbent to each absorber.

Significant increases in power output from the gas turbine, due mostly to reduced need for excess combustion air, can be achieved. In one instance, the calculated net gas turbine power was more than 15 percent higher for a fuel gas produced by the process of this invention than for the same quantity of combustibles in a gas purified by a conventional system.

We claim:

1. In a system for removal of acid gases from a first gas rich in carbon dioxide, available at superatmospheric pressure and containing hydrogen sulfide, and a second gas containing carbon dioxide at a partial pressure lower than in said first gas and containing hydrogen sulfide, where said removed acid gases will comprise mainly carbon dioxide and hydrogen sulfide and may have a hydrogen sulfide content below mole 30%, the process comprising the steps of:

contacting the first gas in a first absorber having a first stage and a second stage with a first solvent having a high selectivity for hydrogen sulfide in counter-current flow of said solvent and said first gas, a portion of the solvent from the second stage being directed to the first stage, whereby said solvent absorbs hydrogen sulfide and carbon dioxide in the first stage and carbon dioxide but not hydrogen sulfide in the second stage;

recovering a hydrogen rich gas from the second stage of the first absorber;

contacting said second gas in a second absorber with another portion of the solvent from the second stage of the first absorber under conditions sufficient to cause said solvent to extract hydrogen sulfide and to release carbon dioxide from said second gas;

flashing the solvent from the first stage of the first absorber consecutively at an intermediate pressure and a lower pressure;

flashing the solvent separated from the first stage of the second absorber at said lower pressure;

compressing the flashed gases from said intermediate and lower pressure flashes to produce compressed gases rich in both carbon dioxide and hydrogen sulfide;

returning the compressed gases to the second absorber;

stripping the carbon dioxide and hydrogen sulfide from the combined flashed first and second solvents to regenerate a lean solvent; and recovering an acid gas stream comprising carbon dioxide containing less than 30 mole percent of hydrogen sulfide from the stripped solvents.

2. The process of claim 1, wherein the first absorber is provided with at least one side chiller to remove the heat of absorption of carbon dioxide.

3. In a system according to claim 1, wherein the solvent is methanol.

4. In a system according to claim 1, wherein the solvent is the dimethyl ether of a polyethylene glycol having 3 to 8 ethylene units.

5. In a system according to claim 1, wherein the solvent is N-methyl pyrolidone.

6. In a system according to claim 1, wherein the pressure of the first gas is above 250 psig, the solvent being in the temperature range of −40° F. to 100° F.

7. In a system according to claim 1, wherein the second gas and the solvent containing carbon dioxide move in countercurrent relationship to each other in said second absorber.

* * * * *